US006970932B1

(12) United States Patent
Juster

(10) Patent No.: US 6,970,932 B1
(45) Date of Patent: Nov. 29, 2005

(54) NON-DELEGABLE CLIENT REQUESTS TO SERVERS STORING LOCAL INFORMATION ONLY

(75) Inventor: Doron Juster, Haifa (IL)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/461,487

(22) Filed: Dec. 14, 1999

(51) Int. Cl.[7] ............................................. G06F 15/16
(52) U.S. Cl. .................. 709/229; 709/203; 709/206; 709/217
(58) Field of Search ............................... 709/231, 312, 709/235, 237, 238, 105, 229, 203, 206, 217; 705/1; 707/3; 718/105; 713/201, 150

(56) References Cited

U.S. PATENT DOCUMENTS

| | | | | |
|---|---|---|---|---|
| 5,535,322 A | * | 7/1996 | Hecht ............................. | 705/1 |
| 5,617,570 A | * | 4/1997 | Russell et al. .............. | 709/312 |
| 5,884,301 A | * | 3/1999 | Takano .......................... | 707/3 |
| 5,903,882 A | * | 5/1999 | Asay et al. ................... | 705/44 |
| 5,926,798 A | | 7/1999 | Carter | |
| 5,987,502 A | | 11/1999 | Banks et al. | |
| 6,003,083 A | | 12/1999 | Davies et al. | |
| 6,014,700 A | | 1/2000 | Bainbridge et al. | |
| 6,078,957 A | * | 6/2000 | Adelman et al. ........... | 709/224 |
| 6,078,960 A | * | 6/2000 | Ballard ........................ | 709/229 |
| 6,141,759 A | * | 10/2000 | Braddy ........................ | 713/201 |
| 6,247,057 B1 | * | 6/2001 | Barrera, III ................. | 709/229 |
| 6,249,801 B1 | * | 6/2001 | Zisapel et al. .............. | 718/105 |
| 6,304,967 B1 | * | 10/2001 | Braddy ........................ | 713/150 |
| 6,345,316 B1 | | 2/2002 | Chessell et al. | |
| 6,377,996 B1 | * | 4/2002 | Lumelsky et al. ......... | 709/231 |
| 6,389,448 B1 | * | 5/2002 | Primak et al. .............. | 709/105 |
| 6,463,454 B1 | | 10/2002 | Lumelsky et al. | |
| 6,466,965 B1 | | 10/2002 | Chessell et al. | |
| 6,466,980 B1 | | 10/2002 | Lumelsky et al. | |
| 6,510,466 B1 | * | 1/2003 | Cox et al. ................... | 709/229 |
| 6,516,350 B1 | | 2/2003 | Lumelsky et al. | |
| 6,671,259 B1 | * | 12/2003 | He et al. ..................... | 370/238 |
| 6,678,726 B1 | * | 1/2004 | Moshaiov .................... | 709/221 |

OTHER PUBLICATIONS

Microsoft Knowledge Base Article. 278939. Oct. 10, 2002. http://support.microsoft.com.*
Microsoft Knowledge Base Article. 289716. May 6, 2001. http://support.microsoft.com.*
Microsoft Knowledge Base Article. 289717. May 6, 2001, http://support.microsoft.com.*
Microsoft Knowledge Base Article. 288313. May 5, 2001, http://support.microsoft.com.*
Microsoft Knowledge Base Article. 288429. Jun. 13, 2001. http://support.microsoft.com.*
Microsoft Knowledge Base Article. 288433. Jun. 28, 2001. http://support.microsoft.com.*
Microsoft Knowledge Base Article. 288599. May 6, 2001. http://support.microsoft.com.*

* cited by examiner

Primary Examiner—Ayaz Sheikh
Assistant Examiner—Christian La Forgia
(74) Attorney, Agent, or Firm—Workman Nydegger

(57) ABSTRACT

Non-delegable client requests to servers storing local information only are disclosed. In one embodiment, a request is sent from a client to a server of a list of servers. The server determines whether it is inappropriate to fulfill the request. If so, it sends an error message to the client that it is off-line. When the client receives the message that the server is off-line, it sends the request to another server on the list, which is continued until a server is found that is able to fulfill the request. Embodiments of the invention thus leverage existing client-known error messages to redirect client requests to other servers.

19 Claims, 7 Drawing Sheets

CLIENT

NON-DELEGABLE CLIENT REQUESTS TO SERVERS STORING LOCAL INFORMATION ONLY

FIELD OF THE INVENTION

This invention relates generally to client requests directed toward servers, and more specifically to non-delegable client requests directed toward servers that maintain only local information.

BACKGROUND OF THE INVENTION

Client-server communications are a common type of inner-computer communications. Typically, one or more clients communicate with one or more servers, over a path that may span one or more networks, each of which that may be a private or a public network. Private networks non-restrictively include corporation-maintained local-area and wide-area networks, intranets, extranets, etc. An example of a public network is the Internet.

In one type of client-server communication, there are one or more servers referred to as directory servers. Directory servers typically maintain a specific type of information, regarding contact and other identification information of clients and servers that may non-restrictively be referred to as directory service-related information. Thus, when a client desires to learn the location, address or identification of another client or of a server, the client is able to query a directory server to obtain this information.

In one type of client-server architecture, each client maintains a list of all the servers within its domain, where domain is non-restrictively defined herein as a predetermined region in which given clients and servers are located and which may share a common part of an identifying address. Each of these servers, in turn, stores a copy of all enterprise-wide directory service-related information—that is, information regarding clients and servers residing anywhere in a region that is wider than the specific domain in which the server is located. Thus, any server can respond to any directory service-related request of a client in its domain, even if the request relates to a client or a server that is not located within the domain.

However, maintaining enterprise-wide information at each server in each domain can be a time-consuming, difficult and expensive task. Therefore, in another type of client-server architecture, each server within a domain only maintains the directory service-related information for the clients and servers in its domain. Clients are configured so that when they send a directory service-related request to a server in their domain, they understand that the request may be delegated by the server to another server for response, particularly if the request relates to a client or a server outside of their domain. The server to which the request is delegated typically lies in a different domain. Thus, when a server fields a directory-service related request from a client, if it is not an appropriate server to respond to the request, the server forwards, non-restrictively referred to herein as delegates, the request to an out-of-domain server. This server may then itself delegate the request if it, too, is an inappropriate server, and this process typically continues until an appropriate server receives the delegated request.

A difficulty exists, however, when clients of the type first described need to communicate with servers of the type described last. That is, clients that do not understand that their directory service-related requests may be delegated to other servers may have difficulty receiving suitable responses to their requests when they are sent to servers that do not store enterprise-wide directory service-related information. For example, a client requesting out-of-domain directory service-related information from a server that does not maintain enterprise-wide directory service-related information will not be able to obtain the information if the server is not able to delegate the request to a server that does store the requested-for information. For this and other reasons, there is a need for the present invention.

SUMMARY OF THE INVENTION

The invention relates to non-delegable client requests of servers storing local information only. In a method of one embodiment, a request is sent from a client to a server of a list of servers. The server determines whether it is inappropriate to fulfill the request—for example, the server determines whether it does not have the information necessary to respond properly to the request. If so, it sends an error message to the client that it is off-line. When the client receives the message that the server is off-line, it sends the request to another server on the list, and this typically continues until a server is found that is able to fulfill the request.

Embodiments of the invention thus leverage an error message that typically is used for another purpose to accommodate clients that do not understand request delegation on a network having servers that otherwise need to use delegation in order to successfully fulfill certain client requests. For example, when a server is truly off-line, the client receives the off-line error message (generated locally) so that the client knows that it has to send the request to a different server.

By a server sending this error message to a client even though it is in fact not off-line, but rather is just not able to fulfill the client's request—instead of delegating the request to another server, as it may ordinarily do for requests made by clients that are able to have their requests delegated—the server is able to compel the client to contact another server with the request. Thus, clients that do not have the capability of understanding servers delegating their requests, but do have the capability of understanding the off-line error message, are able to exist in a client-server architecture where the servers do not maintain enterprise-wide directory service-related information. Embodiments of the invention thus leverage existing client-known error messages for other purposes, specifically utilizing off-line error messages that are known to clients for the different purpose of redirecting the clients to other servers that may be able to field the clients' requests.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities taken the form of electrical or magnetic signals capable of being stored, transferred, combined, compared, and otherwise manipulated.

Figure 1:
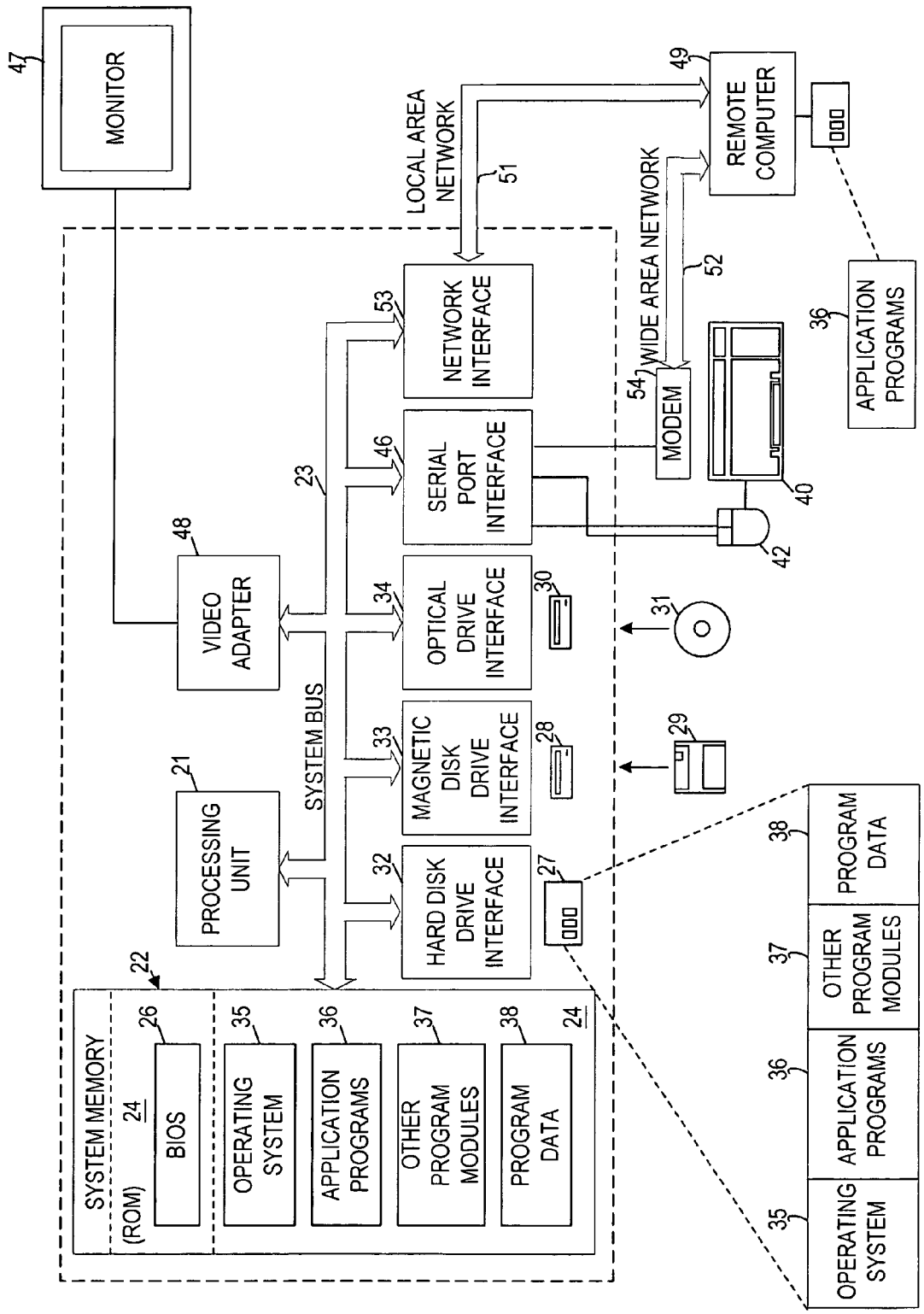
FIG. 1 is a diagram of an operating environment in conjunction with which embodiments of the invention can be practiced.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's register and memories into other data similarly represented as physical quantities within the computer system memories or registers or other such information storage, transmission or display devices Operating Environment Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can stored data that is accessible by a computer, such as magnetic cassettes, flash memory cards, digital video disks, Bernoulli cartridges, random access memories (RMAs) read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Overview and Systems

In this section of the detailed description, an overview of an embodiment of the invention, and systems according to varying embodiments of the invention, are described. The description is made in conjunction with FIGS. 2 and 3. Those of ordinary skill within the art can appreciate, however, that the invention is not limited to the overview and systems described herein.

Figure 2:
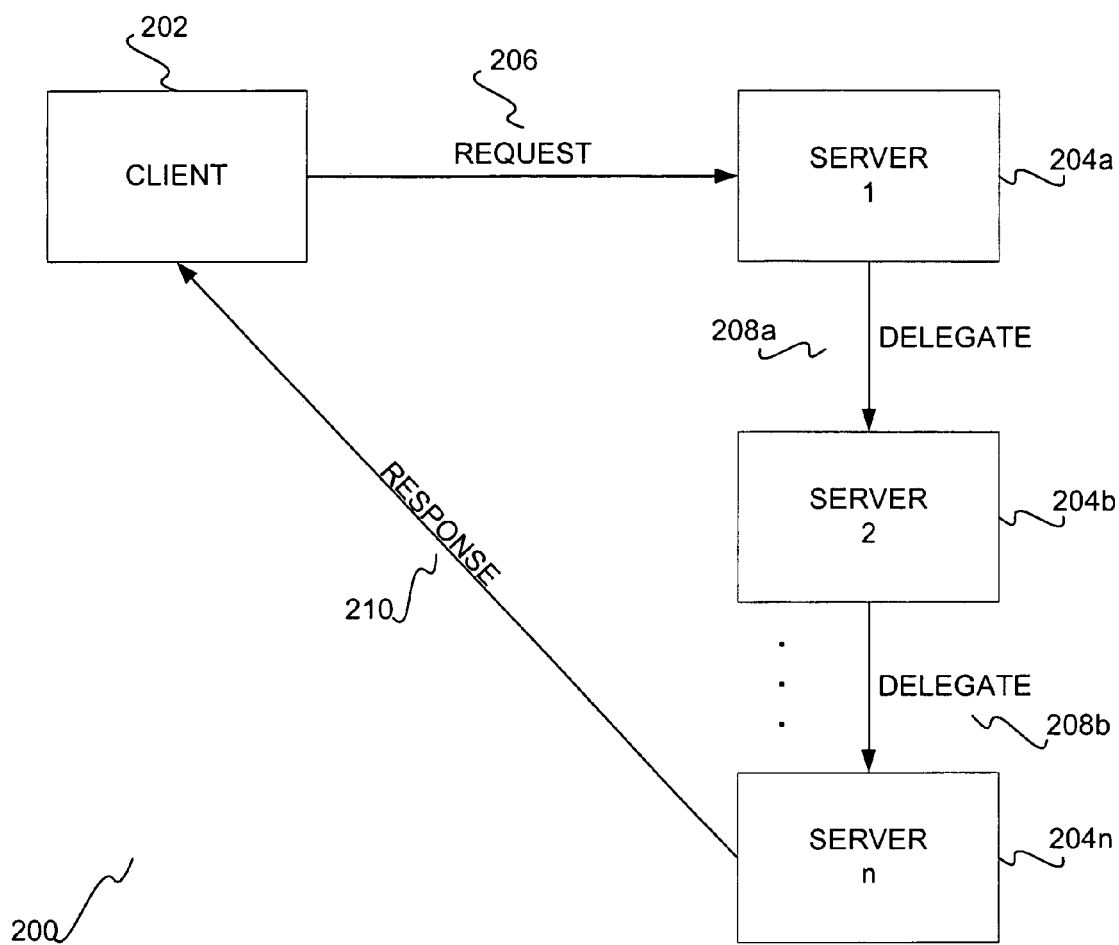
FIG. 2 is a diagram of a system with a client and a number of servers, in which the client's request is delegated among the servers.

Referring first to FIG. 2, a diagram of a system of a client and a number of servers, in which a request from the client is delegated among the servers, is shown. The system 200 includes the client 202, and the servers 204a, 204b, ..., 204n. Each of the client 202 and the servers 204 can in one embodiment be a computer, such as described in the previous sections of the detailed description. In one embodiment, each of the servers 204 is and/or comprises a directory server, such that it stores directory service-related information. Also, in one embodiment, each of the servers 204 lies in a different domain from one another, such that each stores different directory service-related information. That is, each server 204 stores directory service-related information local to its domain only, and not enterprise-wide information, for example.

The client 202 generates a request for particular directory service-related information. The client 202 also in one embodiment maintains a list of servers, such as the servers 204, that it is able to send the request to. The client 202 is of a predetermined type that it is capable of having its request delegated among the servers. That is, it understands that its request may be delegated among the servers, such that the request may be fulfilled by a server other than that to which it originally sent the request.

Thus, the client 202 sends the request 206 to the server 204a, over a network such as one or more of a local-area network (LAN), wide-area network (WNA), extranet, intranet, and the Internet. As shown in FIG. 2, the server 204a is not able to fulfill the request 206 locally. For example, the request 206 may related to directory service-related information that it not stored by the server 204a—i.e., the request 206 may relate to directory service-related information for a client or a server that is not a part of the domain of which the server 204a is a part.

Therefore, the server 204a delegates the request 206 to the server 204b, as represented by line 208a of FIG. 2, over a network such as one or more of a local-area network (LAN), wide-area network (WAN), extranet, intranet, and the Internet. As shown in FIG. 2, the server 204b likewise is not able to fulfill the request 206 locally. For example, the request 206 may related to directory service-related information that is not stored by the server 204b—i.e., the request 206 may relate to directory service-related information for a client or a server that is not a part of the domain of which the server 204b is a part.

Therefore, the server 204b delegates the request 206 to the server 204n, as represented by line 208b of FIG. 2, over a network such as one or more of a local-area network (LAN), wide-area network (WAN), extranet, intranet, and the Internet. As shown in FIG. 2, the server 204n is fulfill the request 206 locally. For example, the request 206 may relate to directory service-related information that is stored by the server 204n—i.e., the request 206 may relate to directory service-related information for a client or a server that is a part of the domain of which the server 204n is a part. Therefore, the server 204n fulfills the request, and sends a response 210 back to the client 202 that includes the request-for information in the request 206.

It is noted, that in other delegated systems, when a request is delegated from one server to another, the server that ultimately provides the response returns it to the server that delegated the request thereto, such that the server that originally received the request from the client returns the response back to the client. For example, if a first server delegates a request to a second server, which delegates the request to a third server that generates the response, the third server returns the respond to the second server, which returns the response to the first server, which returns the response to the requesting client. That is, only the server that received the client request replies to the client; the server that generated the response may not even known the identity of the client.

Figure 3:
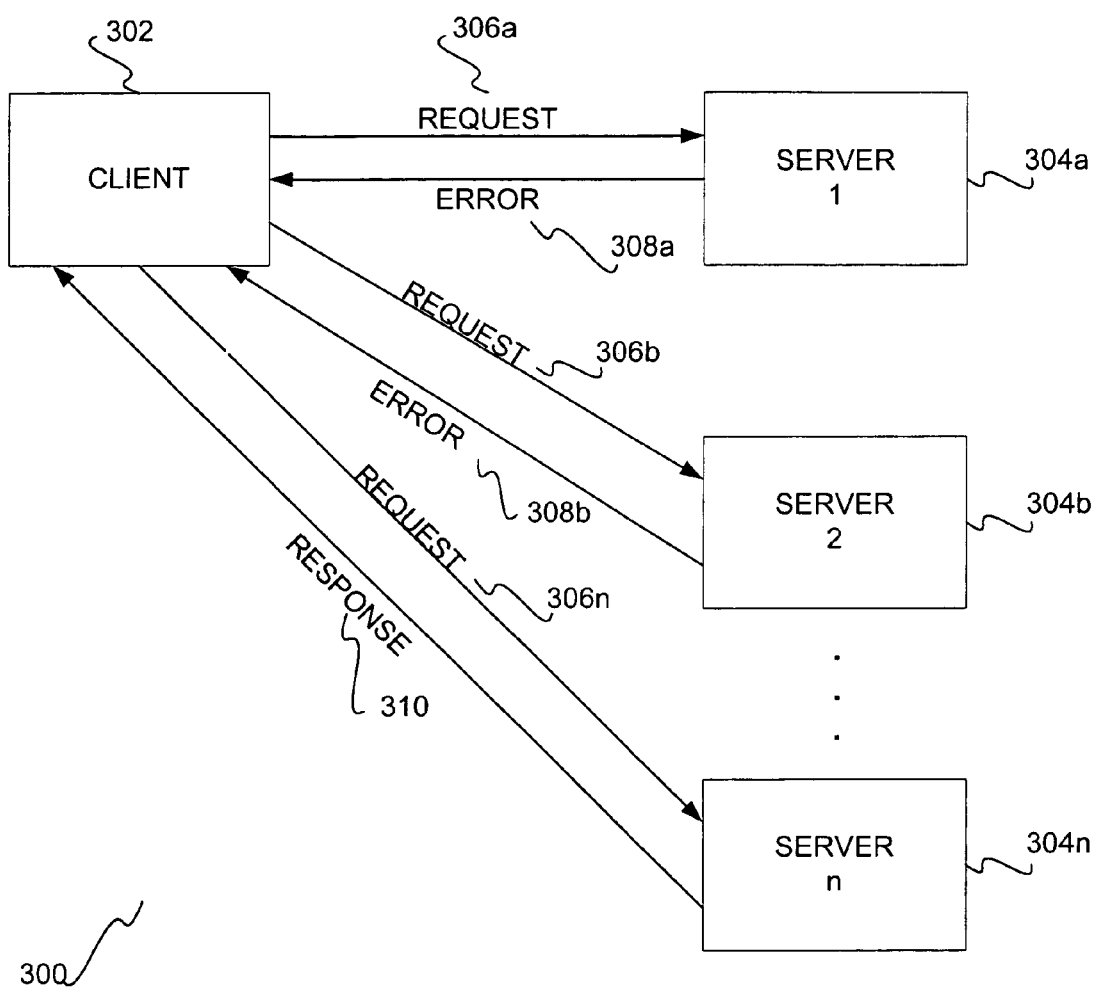
FIG. 3 is a diagram of a system with a client and a number of servers, in which servers that are unable to fulfill the client's request send back an error message that they are off-line, according to one embodiment of the invention.

Referring next to FIG. 3, a diagram of a system of a client and a number of servers, in which a request from the client is not delegated among the servers, according to one embodiment of the invention, is shown. The system 300 includes the client 302, and the servers 304a, 304b, ..., 304n. Each of the client 302 and the servers 304 can in one embodiment be a computer, such as described in the previous section of the detailed description. In one embodiment, each of the servers 304 is and/or comprises a directory server, such that it stores directory service-related information. Also, in one embodiment, each of the servers 304 lies in a different domain from one another, such that each stores different directory service-related information. That is, each server 304 stores directory service-related information local to its domain only, and not enterprise-wide information, for example. In one embodiment, the servers 304 are the same servers as the servers 204 of FIG. 2.

The client 302 includes in one embodiment a communication device so that it is able to send and receive information over a network. Such a communications device can include a network adapter, a modem such as an analog modem, an ISDN modem, a cable modem, a DSL modem, etc., a wireless transceiver, etc. The invention is not limited to a particular communications device for the client 302 in this embodiment. Also, in one embodiment, the client 302 includes a computer program, such as can be executed by processor of the client 302 from a computer-readable medium thereof.

The program is designed to repeat sending a request to a different server of a list of servers via the communications device until an error message that the server is off-line, as used by the server when the server is inappropriate to fulfill the request, is not received in response, as will be described in metal detail. In one embodiment, the program can act as a means for repeating sending a request to a different server of a list of servers via the communications device until an error message that the server is off-line is not received in response.

The servers 304 can each in one embodiment include in one embodiment a communications device so that it is able to send and receive information over a network. Such a communications device can include a network adapter, a modem such as an analog modem, an ISDM modem, a cable modem, a DSL modem, etc., a wireless transceiver, etc. The invention is not limited to a particular communications device for the servers 304 in this embodiment. Also, in one embodiment, each of the servers 304 includes a computer program, such as can be executed by processor of the server from a computer-readable medium thereof.

The program is designed to send via the communications device an error message that the server computer is off-line, in response to a non-delegable request from a client, when the server computer is inappropriate to fulfill the request, as will be described in more detail. In one embodiment, the program can act as a means for so doing. In another embodiment, the program is further designed to delegate a delegable client request to another server via the communications device, when the server is inappropriate to fulfill the request, as will be described in more detail. The program can also act as a means for so doing. Finally, in another embodiment, the program is further designed to fulfill the request when the server is appropriate to do so, as will be described in more detail. The program can also act as a means for so doing.

The client 302 generates a request for particular directory service-related information. The client 302 also in one embodiment maintains a list of servers, such as the servers 304, that is able to send the request to. The client 302 is a predetermined type that it is NOT capable of having its request delegated among the servers. That is, it expects that its request will be fulfilled by the same server to which it originally sent the request.

The client 302 sends the request 306a to the server 304a, over a network such as one or more of a local-area network (LAN), wide-area network (WAN), extranet, intranet, and the Internet. As shown in FIG. 2, the server 304a is not able to fulfill the request 306a locally. For example, the request 306a may relate to directory service-related information that is not stored by the server 304a—i.e., the request 306a may related to directory service-related information for a client or a server that is not a part of the domain of which the server 304a is a part.

Because the client 302 is not able to understand delegation of the request 306a, the request 306a is non-delegable, such that the server 304a cannot delegate the request 306a to other of the servers 304 for fulfillment thereby. Therefore, it instead sends a response back to the client 302 that includes the off-line error message 308a. This error message 308a indicates to the client 302 that the server 304a is off-line, and thus cannot currently handle the request 306a. This is not in fact true; the server 304a is on-line. However, the client 302 is configured so that when it does receive the off-line error messages 308a, it resends the request 306a to another server 304.

Therefore, the client 302 sends the request 306b to the server 406b, over a network such as one or more of a local-area network (LAN), wide-area network (WAN), extranet, intranet, and the Internet. The request 306b is identical to the request 306a in one embodiment, except that its intended receiver is the server 304b, as opposed to the server 304a. As shown in FIG. 2, the server 304b is not able to fulfill the request 306b locally. For example, the request 306b may relate to directory service-related information that is not stored by the server 304b—i.e., the request 306b may relate to directory service-related information for a client or a server that is not a part of the domain of which the server 304b is a part.

Because the client 302 is not able to understand delegation of the request 306b, the request 306b is non-delegable, such that the server 304b cannot delegate the request 306b to other of the servers 304 for fulfillment thereby. Therefore, it instead sends a response back to the client 302 that includes the off-line error message 308b, which in one embodiment is identical and/or comparable to the error message 308a except for the server that sent it. This error message 308b likewise indicates to the client 302 that the server 304b is off-line, and thus cannot currently handle the request 306b. This is not in fact true; the server 304b is on-line. However, the client 302 is configured so that when it does receive the off-line error message 308b, it resends the request 306b to another server 304.

Therefore, the client 302 sends the request 306n to the server 304n, over a network such as one or more of a local-area network (LAN), wide-area network (WAN), extranet, intranet, and the Internet. The request 306n is identical to the request 306a in one embodiment, except that its intended receiver is the server 304n, as opposed to the server 304a. As shown in FIG. 2, the server 304n is able to fulfill the request 306n locally. For example, the request 306n may relate to directory service-related information that is stored by the server 304n—i.e., the request 306n may relate to directory service-related information for a client or a server that is a part of the domain of which the server 304n is a part. Therefore, the server 304n fulfills the request, and sends a response 310 back to the client 302 that includes the requested-for information in the request 306n.

Thus, as shown in the diagram of FIG. 3, embodiments of the invention leverage existing error-handling capabilities of clients that are not able to have their requests delegated among servers. A server that is not able to delegate a client's request instead sends back an error message that it is off-line to the client. The client, when receiving this error message, assumes that the server is in fact off-line, and sends the request to another server for fulfillment thereby. Thus, clients that have non-delegable requests can exist in client-server architectures in which, for example, the servers do not maintain enterprise-wide directory service related information, but just local directory service-related information for the clients and servers in their specific domain only.

Thus, each server of FIG. 3 is designed to send an error message that it is off-line in response to receiving a request that it is unable to fulfill locally from a client of a type that is not able to have its requests delegated. Similarly, the client of FIG. 3 is of this type, and is designed to repeat sending a request to a different server until it does not receive the off-line error message in response. The servers of FIG. 3 each may also be designed to delegate to another server a request that it is unable to fulfill locally which is received from a client of a type that is able to have its request delegated. An example of such a client is the client of FIG. 2, which is a client of this type, and is designed to send such a delegable request to one of the servers.

Methods

In this section of the detailed description, methods according to varying embodiments of the invention are described. The description is made with reference to FIGS. 4–6, which are flowcharts of computer-implemented methods according to varying embodiment of the invention. The computer-implemented methods are desirably realized at least in part as one or more programs running on one or more computers—that is, as a program executed from a computer-readable medium such as a memory by a processor of a computer. The programs are desirably storable on a machine-readable medium such as a floppy disk or a CD-ROM, for distribution and installation and execution on another computer.

Figure 4:
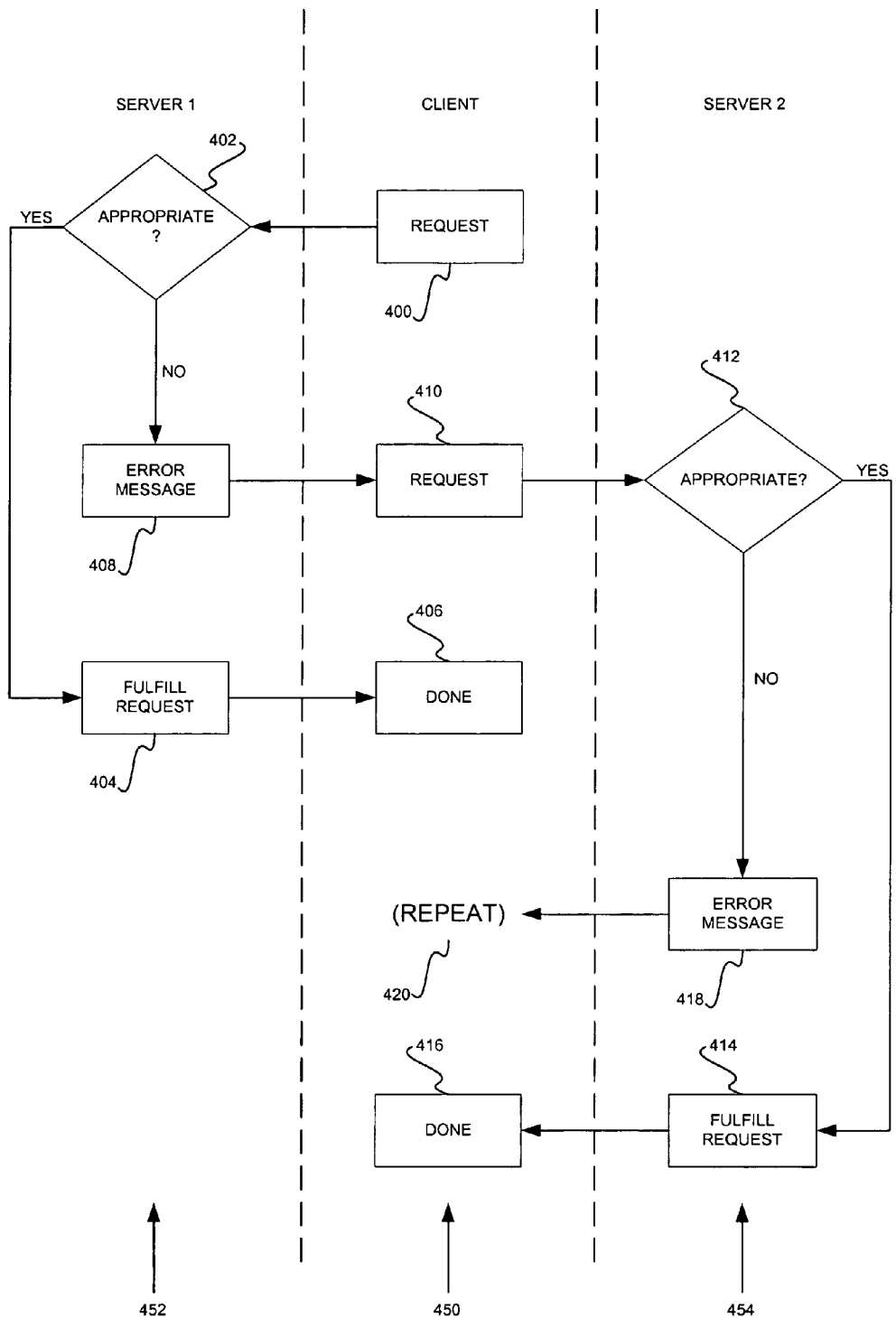
FIG. 4 is a flowchart of a method showing the overall operation of one embodiment of the invention.

Referring first to FIG. 4, a flowchart of an overall method performed within a client-server architecture, according to one embodiment of the invention, is shown. The method is performed by a client and two servers as divided by dotted lines in FIG. 4—400, 410, 406, 416 and 420 are performed by the client, as indicated by section 450 of FIG. 4; 402, 404 and 408 are performed by a first server, as indicated by section 452; and, 412, 414 and 418 are performed by a second server, as indicated by section 454. Arrows between boxes of FIG. 4 that cross the dotted lines indicates communication between the client and one of the servers, for example, over a network.

In 400, a client generates a request. The client is presumed to be of a type that is not able to have its requests delegated by a server to other servers. That is, the client expects that the server to which it sends a request will be the server that responds to the request. The request can in one embodiment relate to directory service-related information, as described in the previous section of the detailed description.

The request is sent from the client to the first server, where in 402 it is determined whether the first server is the appropriate server to fulfill the request. For example, if the request relates to directory service-related information for a client or a server within a particular domain, the first server may be appropriate to fulfill this request only if it is also within this particular domain, such that it maintains information regarding all the clients and server within the domain. That is, in one embodiment, a server is the appropriate server to fulfill a client request where the request relates to information that is stored locally at the server, although the invention itself is not so limited.

If the first server determines that it is appropriate to fulfill the request, then it does so in 404, such that a response is sent to the client with the requested-for information, and the method is done in 406. Otherwise, the first server sends an error message to the client that it is off-line in 408. This is technically not true—the first server is not in fact off-line. However, the client is able to respond to error messages that servers are off-line by sending its request to another server. Therefore, sending this error message compels the client to send its request elsewhere (i.e., to another server).

Therefore, in 410, the client resends the request 410 to a different server, the second server. In 412, the second server determines whether it is the appropriate server to fulfill the request, as the first server did in 402. If the second server is appropriate, then it fulfills the request in 414, and sends a response including the client-requested information back to the client, and the method is finished in 416. Otherwise, the second server sends an error message that it is off-line in 418, as the first server did in 408.

If the second server does send this error message, then as indicated in 420, the method repeats, but with a different server, such as a third server not shown or represented in FIG. 4. Thus, the client can in one embodiment maintain a list of servers, such that it sends the request to each of the servers, until desirably one of the servers does not return the off-line error message, such that this message is not received by the client. The method of FIG. 4 depicts this process for only a first and a second server on the list, although the process itself can continue on for any number of servers.

Figure 5:
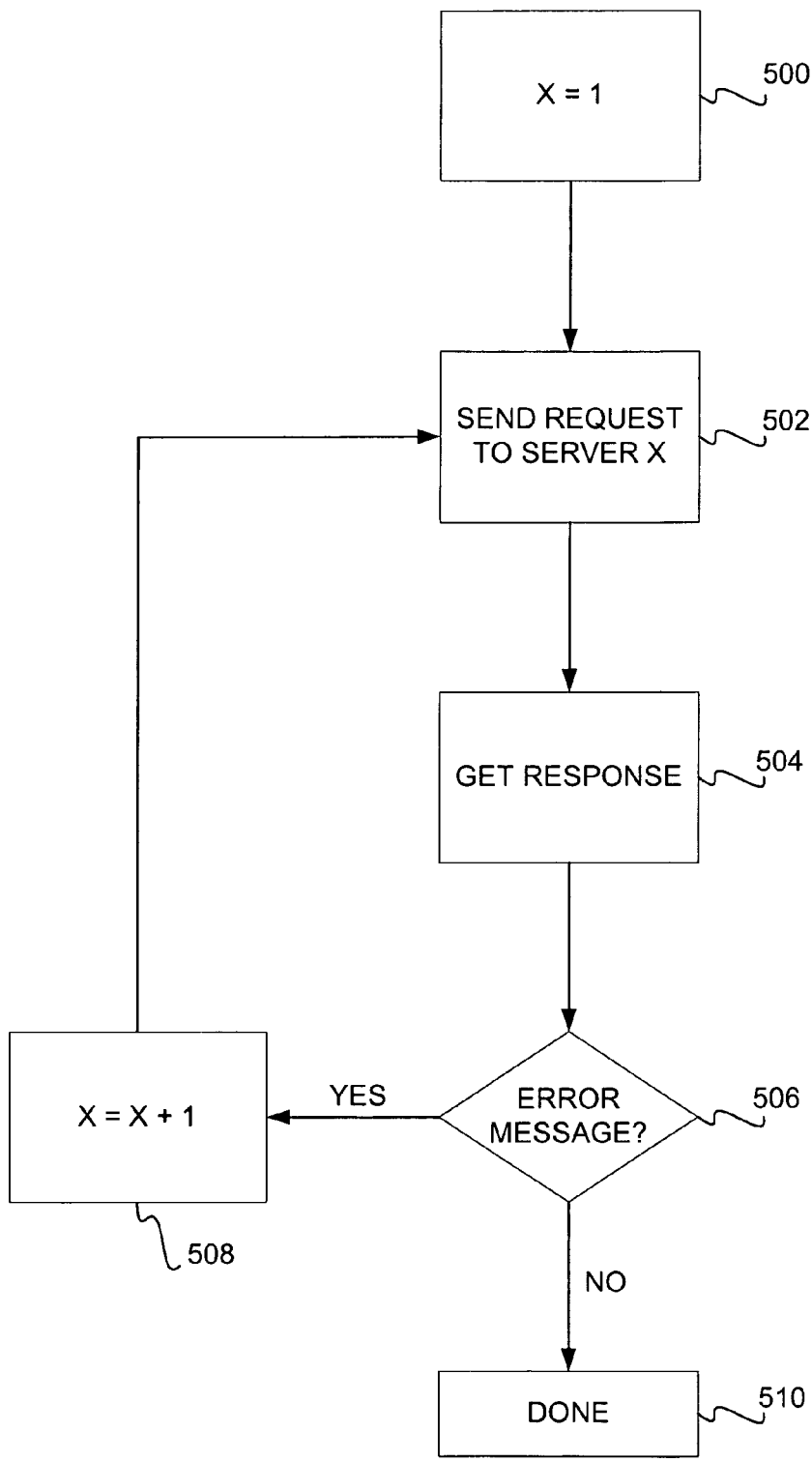
FIG. 5 is a flowchart of a method for a client, according to one embodiment of the invention.

Referring next to FIG. 5, a flowchart of a method performable by a client that is not able to have its requests delegated among servers, according to one embodiment of the invention, is shown. The client maintains a list of servers, such that in 500, the pointer x is set to one to indicate the first server on the list. In 502, it sends its request to server number x, such as the first server, and in 504 receives a response from server number x. If the response contains an error message that this server is off-line—sent by the server to indicate that it cannot fulfill the client's request, for example—then the method proceeds from 506 to 508, where it increments the pointer x by one to indicate the next server in the list, and the method goes back to 502, to repeat sending the request to a different server (i.e., the server within the list now pointed to by the pointer x—server number x). Otherwise, the method is finished at 510.

It is noted that the number of the serves in the list can be finite. Thus, it is legitimate that a client queries all the servers in the list, and still does not receive a response, in which case the query fails, and the client may think that there is no server online. This situation is not shown in FIG. 5, however.

Figure 6:
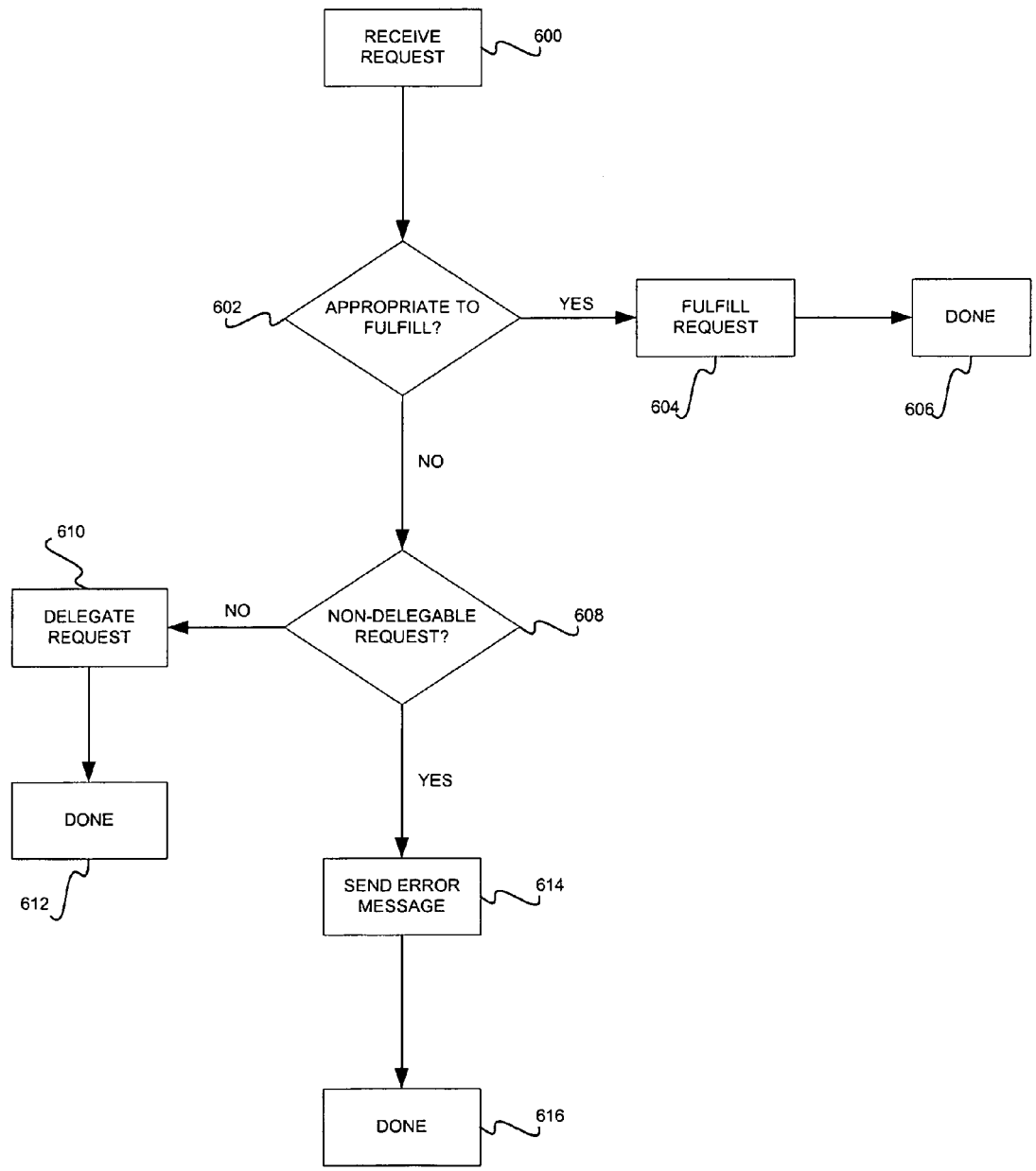
FIG. 6 is a flowchart of a method for server, according to one embodiment of the invention; and, FIG. 7 is a diagram of a client according to an embodiment of the invention.

Referring finally to FIG. 6, a flowchart of a method performable by a server that is able to respond to both delegable and non-delegable client request that it can or cannot fulfill, according to an embodiment of the invention, is shown. In 600, the server receives a request from a client, and in 602, determines whether it is an appropriate server to fulfill the request—for example, the server determines whether it has the information stored locally to fulfill the request. If so, then the method proceeds to 604, where the server fulfills the request and sends a response back to the client that sent the request in 600, the response including the request-for information, and the method is done at 606.

Otherwise, the method proceeds from 602 to 608, where the server determines whether the client that sent the request allows for delegation of the request to another server—thus, whether the client is of a type that allows for delegation, or is of another type that does not allow for delegation. That is, in 608, the server determines whether the request is non-delegable or not. If the message is delegable—that is, for example, the client sending the request allows for delegation thereof—then the method proceeds to 610, where the server delegates the request to another server, and the method ends at 612. Otherwise, the method proceeds to 614, where the server ends an off-line error message to compel the client to send the request to another server, even though the server is not off-line. The method then ends at 616.

Client Architecture

Figure 7:
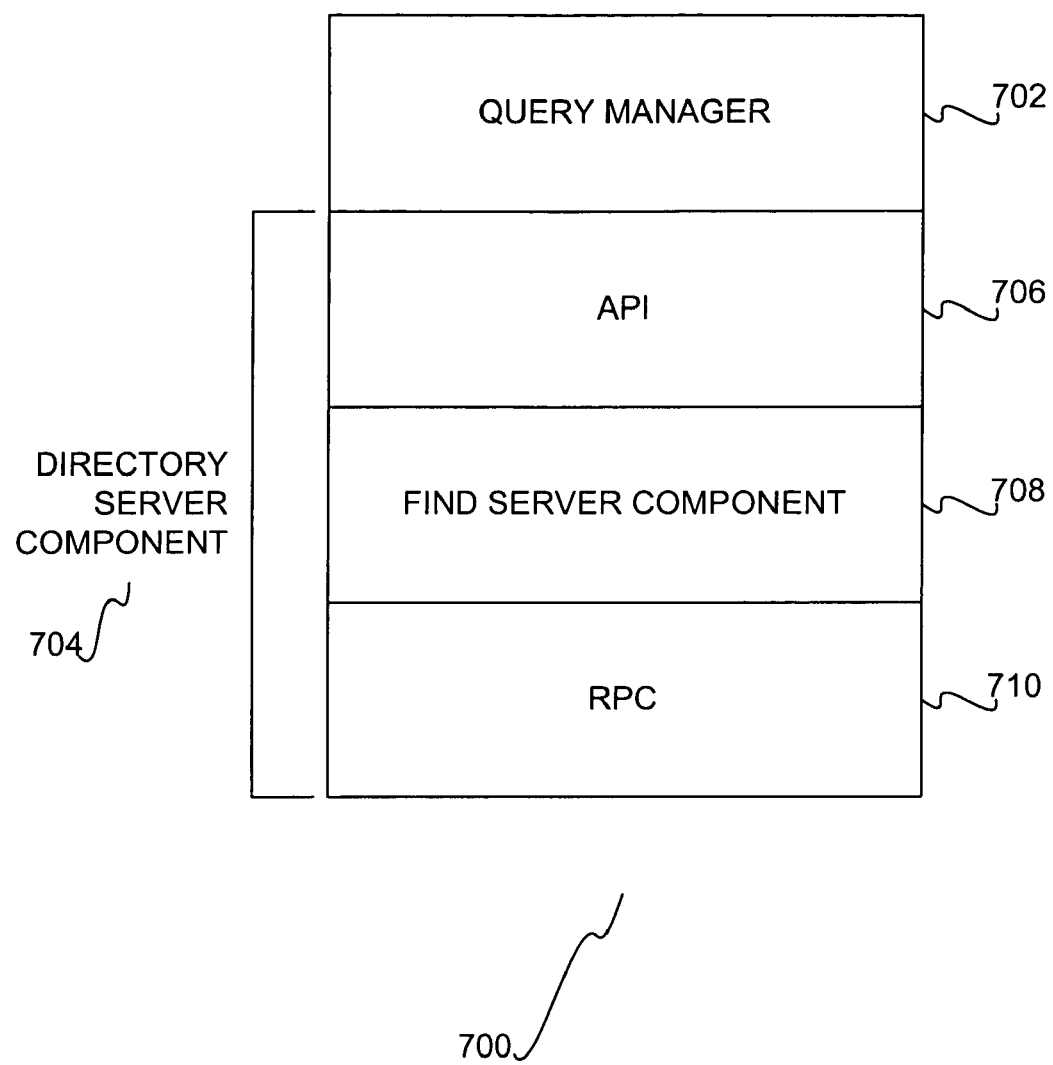

In this section of the detailed description, a description of a client architecture according to one embodiment of the invention is shown. The description is made with reference to FIG. 7, which is a diagram of a client according to an embodiment of the invention. The client 700 of FIG. 7 includes a query manager 702, and a directory server component 704. The query manager 702 receives queries from applications running on the client 700 (not shown in FIG. 7), and generates a request to be sent to a server for each query. The directory server component 704 locates a server able to fulfill the request, and sends the request thereto, so that the request can be fulfilled and the resulting information can be received by the originating application through the manager 702.

The directory server component 704 itself is made of an application programming interface (API) 706, a find server component 708, and a remote procedure call (RPC) 710. The API 706 receives the request from the query manager 702; that is, the query manager 702 calls the API 706 with the request it generated. The find server component 708 maintains a list of servers that is able to receive the request. Thus, the RPC 710 is used by the directory server component 704 to send the request from the manager 702 as received by the API 706 to one of the list of servers as maintained by the component 708. If the off-line error message is received, then another server in the list maintained by the component 708 is sent the request via the RPC 710, until desirably the off-line error message is not received in response to the sending of the request.

It is noted that, in one embodiment, when a server is truly off-line, the offline error code is generated locally on the client computer. The RPC 710 component on the client computer generates the offline-error, and the component 708 uses the error to try another server. Thus, in embodiments of the invention, the server generates the same error when it wants to direct the client to another server. That is, the component 708 cannot distinguish between an offline error generated by the RPC component 710 when server is truly offline or the same error when transmitted from the server.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

What is claimed is:

1. A computer-implemented method for an on-line server responsive to a client, the method comprising
receiving a request from the client, the server being chosen from a list of servers, the list being maintained by the client;
determining whether the server is inappropriate to fulfill the request based on the client being a non-delegable client that does not understand a delegation of the request to another server; and
if the server determines that the server is inappropriate to fulfill the request, sending an error message to the client, the error message identifying the server as being off-line, even though the server is on-line, such that the error message is a false error message, to enable the client to send the request to a next server on the list of servers.

2. The method of claim 1, wherein receiving the request from the client comprises generating the request at a query manager of the client.

3. The method of claim 2, wherein the client receives the request from the query manager at an application programming interface (API) of the client.

4. The method of claim 3, wherein the request from the client is received from the API at a component of the client that maintains the list of servers.

5. The method of claim 1, wherein sending the request from the client further comprises sending the request using a remote procedure call of the client.

6. A machine-readable medium having instructions stored thereon for execution by a processor of a client to perform a method comprising:
sending a request to a server, the server being chosen from a list of servers, the list being maintained by the client;
receiving a response to the request from the server; and
upon determining that the response comprises an error message that the server is off-line, automatically repeating the sending of the request to a next server of the list until the error message is not received, wherein the error message that the server is off-line is received even though the server is on-line, such that the error message is a false error message, which the server sends to the client upon determining that the server is inappropriate to fulfill the request;
wherein the client is a non-delegable client that does not understand a delegation of the request to another server.

7. The medium of claim 6, wherein sending a request to a server comprises generating the request at a query manager of the client.

8. The method of claim 7, wherein sending a request to a server further comprises receiving the request from the query manager at an application programming interface (API) of the client.

9. The method of claim 8, wherein sending a request to a server further comprises receiving the request from the API at a component of the client that maintains the list of servers.

10. The method of claim 9, wherein sending a request to a server further comprises sending the request using a remote procedure cell of the client.

11. A client computer comprising:
a communications device; and,
a computer program designed to automatically send a request to a different server of a list of servers, the list being maintained by the client, via the communications device, wherein the automatic sending is responsive to an off-line error message indicating that a server is off-line, wherein the off-line error message labeling received from on-line servers that determine that the client computer is incapable of receiving delegated responses to requests, such that the off-line error message is a false error message;
wherein the client is a non-delegable client that does not understand a delegation of the request to another server.

12. A machine-readable medium having instructions stored thereof for execution by a processor of a server to perform a method comprising:
receiving a request from a client;
determining whether the server is inappropriate to fulfill the request;

determining whether the client is a non-delegable client that does not understand a delegation of the request to another server; and upon determining that the server is inappropriate to fulfill the request due to the client being non-delegable, sending an off-line error message to the client, even though the server is on-line, such that the off-line error message is a false error message, wherein said off-line error message causes the client to forward the request to an alternative server based on a list of servers maintained by the client.

13. The medium of claim 12, the method further comprising:

determining whether the client is of a type capable of understanding a delegation of the request;

upon determining that the server is inappropriate to fulfill the request and that the client is of the type capable of understanding a delegation, delegating the request to another server.

14. The method of claim 12, the method further comprising upon determining that the server is appropriate to fulfill the request, fulfilling the request.

15. A method for a server comprising:

receiving a request from a non-delegable client that does not understand a delegation of the request to another server;

determining whether the request can be fulfilled locally; and if the request cannot be fulfilled locally, sending an error message indicating that the server is off-line, even though the server is on-line, such that the error message is a false error message, to enable the non-delegable client to send the request to a next server.

16. A method for enabling non-delegable clients to exist in a client-server architecture having servers that do not maintain enterprise-wide directory service-related information, the method comprising:

providing each of the servers in the client-server architecture with computer-implemented instructions enabling the server to determine a client from which the server receives a request is a non-delegable client that does not understand a delegation of the request to another server;

responding to the client by determining whether the request can be fulfilled; and if the request cannot be fulfilled, sending an error message, indicating that the server is off-line, even though the server is on-line, such that the error message is a false error message, wherein said off-line error message results in the non-delegable client determining that the server is unavailable to receive the request.

17. A server computer comprising:

a computer device; and, a computer program with computer-implemented instructions enabling the server computer to perform;

determining whether a client from which the server receives a request is a non-delegable client that does not understand a delegation of the request to another server;

if the request cannot be fulfilled, responding by providing that the communications device send a false error message to the non-delegable client, the false error message indicating that the server is off-line, even though the server is on-line, wherein the false error message causes the client to send the request to an alternative server computer.

18. The computer of claim 17, wherein the computer program is further designed to delegate the request to another server computer via the communications device in response to a request from a delegable client that understands a delegation of the request to another server when the server computer is inappropriate to fulfill the request.

19. The computer of claim 17, wherein the computer program is further designed to fulfill the request when the server computer is appropriate to fulfill the request.

\* \* \* \* \*

UNITED STATES PATENT AND TRADEMARK OFFICE
CERTIFICATE OF CORRECTION

PATENT NO. : 6,970,932 B1
APPLICATION NO. : 09/461487
DATED : November 29, 2005
INVENTOR(S) : Doron Juster It is certified that error appears in the above-identified patent and that said Letters Patent is hereby corrected as shown below:

On the Title page, in Item (56), under "U.S. Patent Documents", in column 1, line 2, delete "709/312" and insert -- 719/312 --, therefor.

On the Title page, in Item (56), under "U.S. Patent Documents", in column 1, line 17, delete "709/105" and insert -- 718/105 --, therefor.

On the Title page, in Item (56), under "Other Publications", in column 2, line 5, delete "2001," and insert -- 2001. --, therefor.

On the Title page, in Item (56), under "Other Publications", in column 2, line 7, delete "2001," and insert -- 2001. --, therefor.

In column 1, line 15, delete "inner–computer" and insert -- inter–computer --, therefor.

In column 3, line 7, after "for" insert -- a --.

In column 3, line 21, after "invention," insert -- and --.

In column 3, line 39, delete "taken" and insert -- take --, therefor.

In column 3, line 56, delete "register" and insert -- registers --, therefor.

In column 3, line 59, after "devices" insert -- . --.

In column 4, line 55, delete "stored" and insert -- store --, therefor.

In column 4, line 57, delete "(RMAs)" and insert -- (RAMs), --, therefor.

In column 5, line 59, delete "sections" and insert -- section --, therefor.

In column 6, line 12, delete "(WNA)," and insert -- (WAN), --, therefor.

In column 6, line 15, after "may" delete "related" and insert -- relate --, therefor.

In column 6, line 16, delete "it" and insert --is --, therefor.

In column 6, line 26, after "may" delete "related" and insert -- relate --, therefor.

In column 6, line 43, delete "request–for" and insert -- requested–for --, therefor.

In column 6, line 56, delete "known" and insert -- know --, therefor.

In column 7, line(s) 8–9, delete "communication" and insert -- communications --, therefor.

In column 7, line 24, delete "metal" and insert -- more --, therefor.

In column 7, line 33, delete "ISDM" and insert -- ISDN --, therefor.

In column 7, line 58, after "that" insert -- it --.

In column 7, line 58, after "302 is" insert -- of --.

In column 8, line 3, before "to" delete "related" and insert -- relate --, therefor.

In column 8, line 16, delete "messages" and insert -- message --, therefor.

In column 8, line 19, delete "406b," and insert -- 304b, --, therefor.

In column 8, line 38, delete "308a" and insert -- 308a, --, therefor.

In column 9, line 3, delete "service related" and insert -- service–related --, therefor.

In column 10, line 12, delete "client–requested" and insert -- client requested --, therefor.

In column 10, line 42, delete "serves" and insert -- servers --, therefor.

In column 10, line 46, delete "online." and insert -- on–line. --, therefor.

In column 10, line 50, delete "request" and insert -- requests --, therefor.

In column 10, line 59, delete "request–for" and insert -- requested–for --, therefor.

In column 11, line 4, delete "ends" and insert -- sends --, therefor.

In column 11, line 40, delete "offline–error," and insert -- offline error, --, therefor.

In column 11, line 58, in Claim 1, after "comprising" insert -- : --.

In column 12, line 23, in Claim 6, after "and" insert -- , --.

In column 12, line 38, in Claim 8, delete "method" and insert -- medium --, therefor.

In column 12, line 42, in Claim 9, delete "method" and insert -- medium --, therefor.

In column 12, line 45, in Claim 10, delete "method" and insert -- medium --, therefor.

In column 12, line 47, in Claim 10, delete "cell" and insert -- call --, therefor.

In column 12, line 55, in Claim 11, delete "labeling" and insert -- is --, therefor.

In column 12, line 63, in Claim 12, delete "thereof" and insert -- thereon --, therefor.

In column 13, line 20, in Claim 14, delete "method" and insert -- medium --, therefor. (first occurrence)

In column 14, line 14, in Claim 17, delete "computer" and insert -- communications --, therefor.

In column 14, line 16, in Claim 17, delete "perform;" and insert -- perform: --, therefor.

Signed and Sealed this

Sixteenth Day of March, 2010

David J. Kappos
*Director of the United States Patent and Trademark Office*